United States Patent

Knoedgen et al.

(10) Patent No.: US 10,164,532 B2
(45) Date of Patent: Dec. 25, 2018

(54) SWITCHED POWER CONVERTER WITH MULTIPLE OUTPUTS

(71) Applicant: Dialog Semiconductor (UK) Limited, London (GB)

(72) Inventors: Horst Knoedgen, Munich (DE); Martin Faerber, Munich (DE)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/460,363

(22) Filed: Mar. 16, 2017

(65) Prior Publication Data

US 2017/0271990 A1   Sep. 21, 2017

(30) Foreign Application Priority Data

Mar. 16, 2016   (DE) .................. 10 2016 204 374

(51) Int. Cl.
*H02M 3/158*   (2006.01)
*H02M 1/096*   (2006.01)
*H02M 1/00*   (2006.01)

(52) U.S. Cl.
CPC ........... *H02M 3/158* (2013.01); *H02M 1/096* (2013.01); *H02M 2001/009* (2013.01)

(58) Field of Classification Search
CPC .. H02M 2001/009; H02M 1/08; H02M 1/096; H02M 3/158; H02M 3/1588
See application file for complete search history.

(56) References Cited

U.S. PATENT DOCUMENTS

| 2012/0249103 | A1* | 10/2012 | Latham, II | H02M 3/158 323/282 |
| 2013/0234513 | A1* | 9/2013 | Bayer | G05F 1/577 307/31 |
| 2014/0232189 | A1* | 8/2014 | Gasparini | H02M 3/1584 307/31 |
| 2014/0232359 | A1* | 8/2014 | Dash | H02M 3/158 323/235 |

(Continued)

FOREIGN PATENT DOCUMENTS

DE   10 2014 014 702   7/2015

OTHER PUBLICATIONS

German Office Action, File No. 10 2016 204 374.9, Applicant: Dialog Semiconductor (UK) Limited, dated Dec. 13, 2017, 6 pgs, and English language translation, 6 pgs.

*Primary Examiner* — Fred E Finch, III
(74) *Attorney, Agent, or Firm* — Saile Ackerman LLC; Stephen B. Ackerman

(57) ABSTRACT

A switched mode power converter comprising a main inductor and a half bridge for providing an inductor current is described. The power converter comprises a first output power switch for directing the inductor current to a first output port and bypass circuitry for making at least part of the inductor current available for controlling the switching state of at least one of the power switches. Furthermore, the power converter comprises a control unit configured to control the first output power switch such that the inductor current is directed to the first output port within different first time intervals. Furthermore, the bypass circuitry is controlled to make the inductor current available for controlling the switching state of the at least one power switch during a non-overlapping time interval.

19 Claims, 4 Drawing Sheets

(56) References Cited

U.S. PATENT DOCUMENTS

| | | | | |
|---|---|---|---|---|
| 2015/0077075 A1* | 3/2015 | Knoedgen | ............. | H02M 1/088 323/272 |
| 2015/0188402 A1* | 7/2015 | Panigrahi | ................ | H02M 1/08 307/31 |
| 2016/0181914 A1* | 6/2016 | Knoedgen | ............... | H02M 1/08 318/504 |

* cited by examiner

SWITCHED POWER CONVERTER WITH MULTIPLE OUTPUTS

TECHNICAL FIELD

The present document relates to switched mode power converters, notably DC-DC power converters. In particular, the present document relates to switched mode power converters having multiple output ports.

BACKGROUND

Power converters with multiple outputs, notably single inductor multiple output (SIMO) or single inductor dual output (SIDO) power converters, may be used for supplying energy from a single energy source (e.g. a single battery) to multiple power consumers (e.g. to different components of an electronic device, such as a smartphone). Such power converters with multiple outputs typically comprise switching elements for supplying energy to the different outputs in a mutually exclusive manner. The activation of the different outputs typically involves non-overlapping times between the deactivation of an output and the activation of another output of the power converter. These non-overlapping times may lead to power losses of the power converter.

SUMMARY

The technical problem of providing a power efficient power converter which avoids or reduces such losses during non-overlapping times is presented. In particular, the present document addresses the technical problem of providing efficient means for recycling the above mentioned power losses. According to an aspect, a switched mode power converter, notably a DC-DC power converter, is described. The power converter comprises a main inductor and a half bridge, wherein the half bridge typically comprises a high side power switch and a low side power switch. The half bridge may be used for generating an inductor current through the main inductor. The power switches may be n-type metal oxide semiconductor (MOS) transistors. The power converter may comprise a buck-type converter and/or a boost-type converter. The high side power switch and the low side power switch may be turned on in a mutually exclusive manner at a commutation cycle rate (e.g. in the range of 1 MHz to 100 MHz) to generate the inductor current. By way of example, the high side power switch and the low side power switch may be arranged in series between an input node of the power converter (at an input voltage) and ground (in case of a buck-type power converter). Alternatively, the high side power switch and the low side power switch may be arranged in series between an intermediate node of the power converter and ground (in case of a boost-type power converter).

The power converter comprises a first output power switch configured to direct the inductor current to a first output port of the power converter. Furthermore, the power converter may comprise a second output power switch configured to direct the inductor current to a second output port of the power converter. The power switches may be n-type metal oxide semiconductor (MOS) transistors. In case of a buck-type converter, the main inductor may be coupled (directly) with input ports (e.g. sources) of the first and second output power switches. In case of a boost-type converter, the high side power switch (notably the intermediate node) may be (directly) coupled with the input ports (e.g. sources) of the first and second output power switches.

As such, the power converter may comprise multiple outputs (i.e. at least two output ports).

The power converter may comprise a first output capacitor arranged between the first output port and ground and a second output capacitor arranged between the second output port and ground. As a result of this, stable output currents may be provided at the first and second output ports, even in case of intermittent provision of the inductor current.

The power converter further comprises bypass circuitry configured to make the inductor current available for controlling the switching state of at least one of the power switches (i.e. the high side power switch, the low side power switch, the first output power switch and/or the second output power switch) of the power converter.

In addition, the power converter comprises a control unit (e.g. a microprocessor or a logic unit). The control unit may be configured to control the first output power switch such that the inductor current is directed to the first output port within first time intervals. The time interval between successive first time intervals may comprise a non-overlapping time interval. During the non-overlapping time interval the inductor current may be blocked by the first output power switch from flowing to the first output port.

In particular, the control unit may be configured to control the first output power switch and the second output power switch such that the inductor current is directed to the first output port and to the second output port within different, mutually exclusive, first and second time intervals, wherein the first time interval and the second time interval are separated by a non-overlapping time interval. As such, the inductor current may be provided either to the first output port or to the second output port (for supplying respective loads at the first and the second output ports). On the other hand, the inductor current is not provided to the first and the second output port at the same time. Furthermore, the first time interval and the second time interval are separated by a non-overlapping time interval, during which the inductor current is neither provided to the first output port nor to the second output port.

The control unit is configured to control the bypass circuitry to make the inductor current available for controlling the switching state of the at least one power switch during the non-overlapping time interval. As such, the inductor current may be used for the operation of the power converter, thereby increasing the power efficiency of the power converter.

As indicated above, the at least one power switch may comprise a metal oxide semiconductor transistor which exhibits a gate capacitor (notably a gate-source capacitor). The bypass circuitry may be configured to make the inductor current available for charging the gate capacitor, thereby allowing the at least one power switch to be turned on using the inductor current.

The bypass circuitry may comprise a bypass switch, notably a diode, which is configured to direct the inductor current to a control port (e.g. to a gate) of the at least one power switch, thereby allowing the at least one power switch to be controlled using the inductor current.

The bypass circuitry may comprise a boost capacitor which is arranged to be charged by the inductor current during the non-overlapping time interval. By making use of a boost capacitor, the energy from the main inductor, which is made available during the non-overlapping time interval, may be stored. As a result of this, the usage of the energy (for controlling the at least one power switch) may be decoupled from the provision of the energy (during the non-overlapping time interval), thereby further increasing the power efficiency of the power converter.

The control unit may be configured to vary the duration of the non-overlapping time interval in dependence of a target charging level or target voltage of the boost capacitor. By doing this, the boost capacitor may be set to conditions which are optimized for the control of the at least one power switch.

The boost capacitor may be coupled at a first end to an input port (e.g. the source) of the first output power switch and to an input port (e.g. the source) of the second output power switch during the non-overlapping time interval of the output switches. The bypass circuitry may comprise a charging switch (e.g. a MOS transistor) which is configured to couple a second end of the boost capacitor to ground or to decouple the second end of the boost capacitor from ground. The control unit may be configured to control the charging switch such that the second end of the boost capacitor is coupled to ground during at least part of the non-overlapping time interval. By doing this, the charging time of the boost capacitor may be controlled (e.g. in order to set the boost capacitor to a target charging level or target voltage). Furthermore, the control unit may be configured to control the charging switch such that the second end of the boost capacitor is decoupled from ground during the first and second time intervals, thereby making the electrical charge of the boost capacitor available at a floating voltage for controlling the switching state of the at least one power converter.

The bypass circuitry may comprise one or more control switches which are configured to couple the boost capacitor with a control port (e.g. with the gate) of the at least one power switch. As such, the electrical charge of the boost capacitor may be coupled to the gate capacitor of a power switch for turning on the power switch. In particular, the control unit may be configured to control the one or more control switches to couple the boost capacitor with the control port (e.g. the gate) of the at least one power switch, in order to turn on the at least one power switch.

The bypass circuitry may comprise a first control switch which is configured to direct the inductor current to a control port (e.g. to the gate) of the at least one power switch (directly without using a boost capacitor). The control unit may be configured to control the first control switch to direct the inductor current to the control port of the at least one power switch during the non-overlapping time interval, in order to turn on the at least one power switch. As such, the inductor current may be directed to a control port of a power switch directly without using a boost capacitor, thereby reducing the cost of the power converter.

The at least one power switch may comprise the first output power switch, wherein the first output power switch comprises an input port (e.g. a source) and a control port (e.g. a gate). The bypass circuitry may comprise a first output inductor which is arranged such that the inductor current flows through the first output inductor within the first time interval and such that the inductor current does not flow through the first output inductor within the non-overlapping time interval. In other words, the first output inductor may be arranged to be in series between the main inductor and the input port of first output power switch, but not in series between the main inductor and the control port of first output power switch. As a result of the delay caused by the first output inductor to the inductor current which flows towards the input node of the first output power switch, the gate capacitor of the first output power switch may be charged directly with the inductor current, without the need for a boost capacitor.

The bypass circuitry may comprise a second control switch which is configured to couple the control port of the at least one power switch to ground. The control unit may be configured to control the second control switch to couple the control port of the at least one power switch to ground, in order to turn off the at least one power switch. In particular, the second control switch may be used to discharge the gate capacitor of the at least one power switch.

The control unit may be configured to turn on the first output power switch and the second output power switch in a mutually exclusive manner, in dependence of load current requirements of loads at the first and at the second output port. The inductor current may be provided to the first output port within a first time interval and to the second output port within a second time interval. The duration of the first time interval and/or of the second time interval may be dependent on the load current requirements of the respective loads at the first and at the second output port.

Alternatively or in addition, the first time interval and/or second time interval may be repeated (e.g. in a periodic manner). The repetition rate of the first and/or second time intervals may be dependent on the load current requirements of the respective loads at the first and at the second output port.

Furthermore, the power converter may comprise an auxiliary power switch which is configured to direct the inductor current to ground. The control unit may be configured to control the auxiliary power switch in dependence of the load current requirements of loads at the first and at the second output port. In particular, the auxiliary power switch may be used to draw an inductor current at relatively low load current requirements, thereby ensuring a provision of power for the at least one power switch, even in case of relatively low load current requirements. This may be used e.g. during the start-up phase of the power converter to provide energy to the bypass capacitor using the auxiliary power switch.

The power converter may comprise or may be a buck converter, a boost converter, a buck-boost converter and/or a negative voltage converter. The switches of the power converter may comprise or may be active switches or passive switches (such as diodes). The charge of the boost capacitor may be used for supplying one or more power switches of the power converter. Alternatively or in addition, the charge of the boost capacitor may be used for supplying other functions, e.g. supporting functions.

According to a further aspect, a method for distributing an inductor current of a switched mode power converter which comprises a main inductor and a half bridge with a high side power switch and a low side power switch for generating the inductor current is described. The method comprises directing the inductor current to a first output port of the power converter during a first time interval using a first output power switch, and directing the inductor current to a second output port of the power converter during a second time interval using a second output power switch, wherein the first and second time intervals are mutually exclusive and separated by a non-overlapping time interval. The method further comprises making the inductor current available for controlling the switching state of (notably for turning on or off) at least one of the power switches of the power converter during the non-overlapping time interval.

According to a further aspect, a software program is described. The software program may be adapted for execution on a processor and for performing the method steps outlined in the present document when carried out on the processor.

According to another aspect, a storage medium is described. The storage medium may comprise a software program adapted for execution on a processor and for performing the method steps outlined in the present document when carried out on the processor.

According to a further aspect, a computer program product is described. The computer program may comprise executable instructions for performing the method steps outlined in the present document when executed on a computer.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
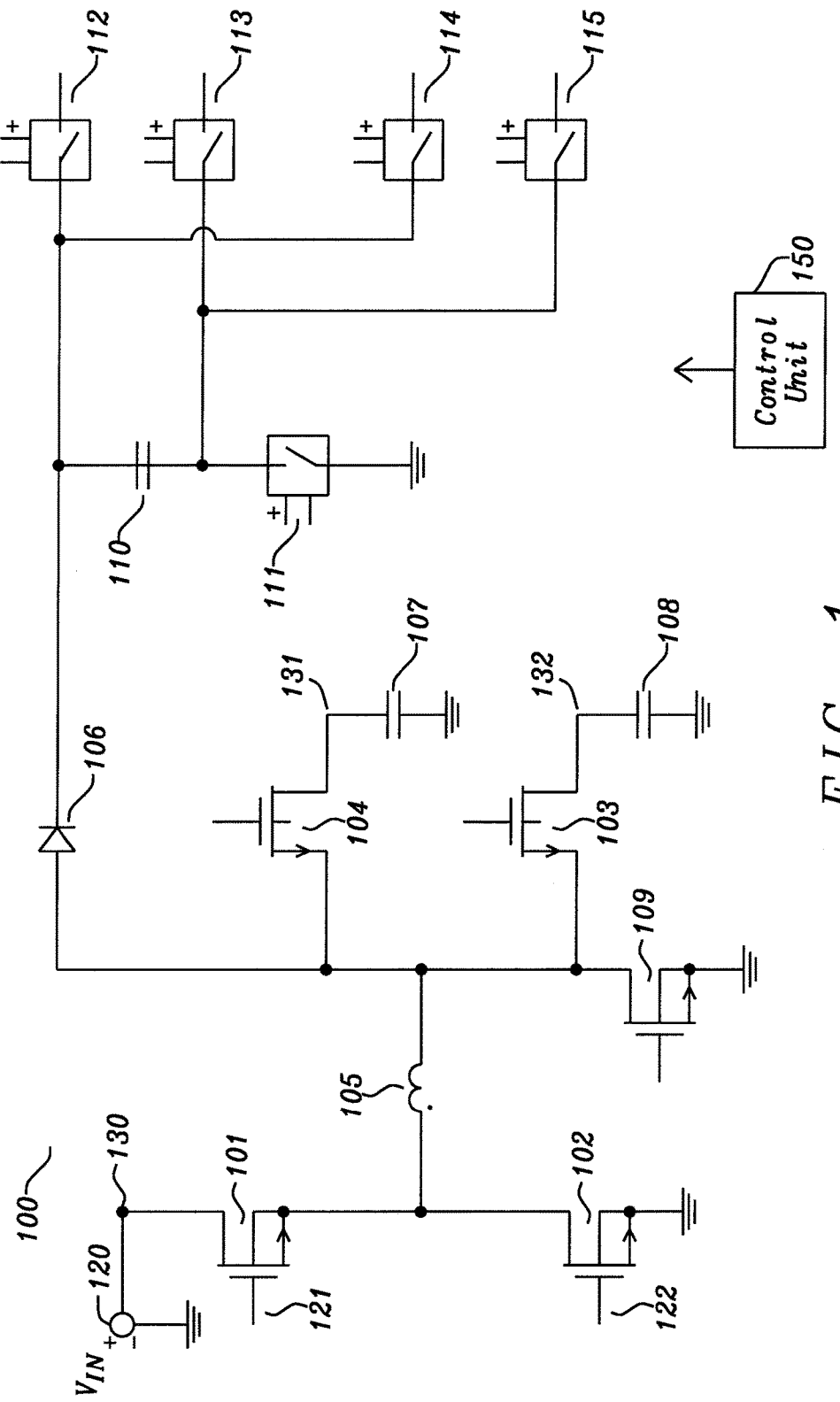
FIGS. 1 and 2 show example power converters comprising bypass circuitry for the inductor current during the non-overlapping times between the different outputs of the power converter.

As outlined above, the present document is directed at providing a power efficient power converter having multiple outputs. In this context FIG. 1 shows an example buck converter 100 having a first output port 131 and having a second output port 132. The buck converter 100 comprises a half bridge with a high side switch (also referred to has a high side power switch) 101 and a low side switch (also referred to as a low side power switch) 102 (the low side switch may be implemented as a diode). Furthermore, the buck converter 100 comprises a main inductor 105 which is coupled to ground (via the low side switch 102) or to the input voltage 120 (via the high side switch 101) in a periodic manner (according to a commutation cycle rate).

The power converter 100 is configured to convert electrical power from an input port 130 to electrical power which is provided at the first output port 131 or at the second output port 132 in a mutually exclusive manner. For this purpose, the first output port 131 may be coupled to or decoupled from the main inductor 105 using a first output switch (also referred to as a first output power switch) 104 and the second output port 132 may be coupled to or decoupled from the main inductor 105 using a second output switch (also referred to as a second output power switch) 103. Furthermore, the power converter 100 may comprise a first output capacitor 107 which is coupled between the first output port 131 and ground, as well as a second output capacitor 108 which is coupled between the second output port 132 and ground.

Figure 3:
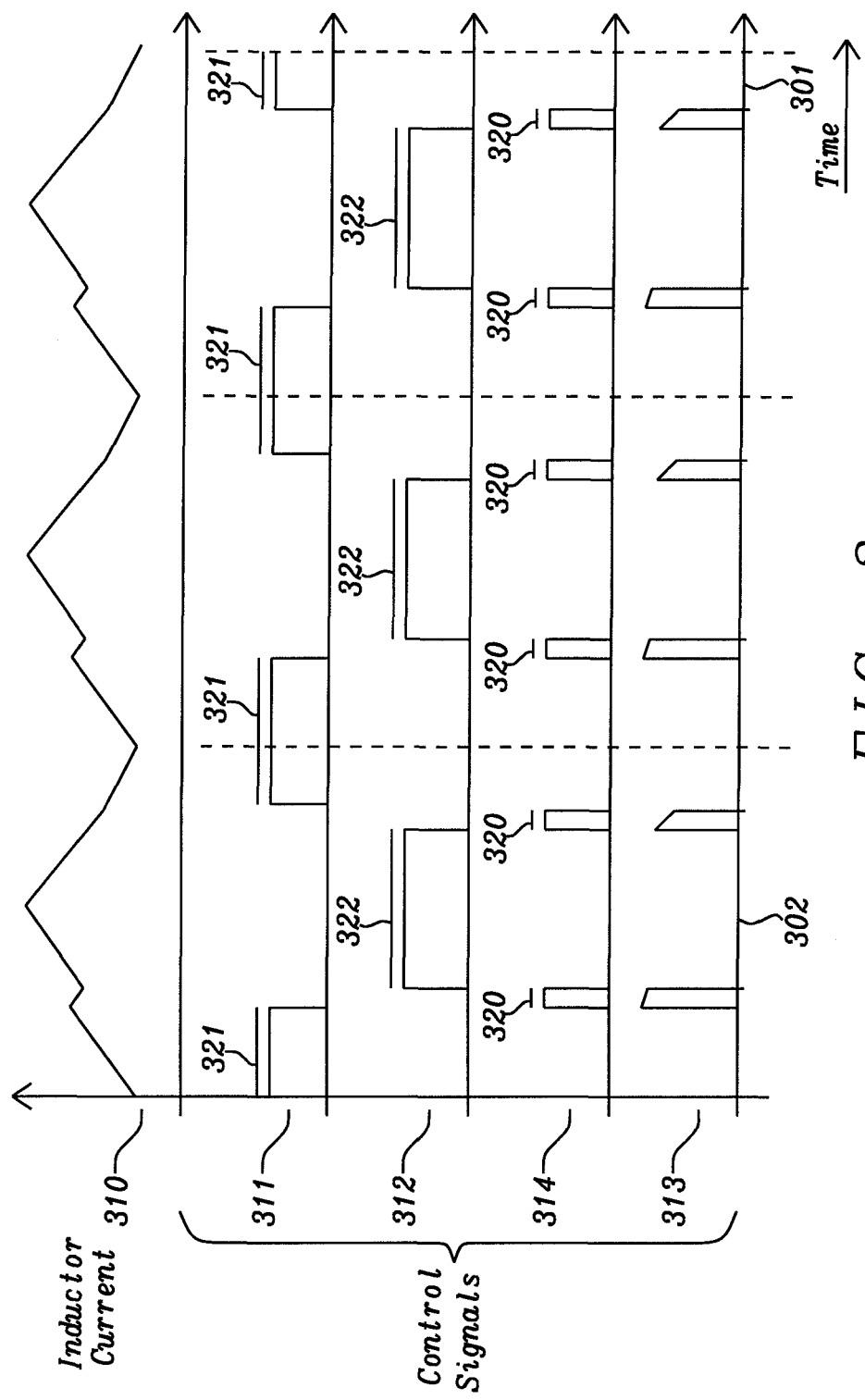
FIG. 3 shows an example inductor current and an example bypass current.

FIG. 3 shows an example inductor current 310 during several commutation cycles 302 as a function of time 301. Furthermore, FIG. 3 shows example control signals 311, 312 for the first and second output switches 104, 103, respectively, wherein a high level indicates that the respective output switch 104, 103 is on, thereby directing the inductor current 310 to the respective output port 131, 132, and wherein a low level indicates that the respective output switch 104, 103 is off, thereby blocking the inductor current 310. As such, the inductor current 310 is provided to the first or to the second output port 131, 132 in a pulsed manner, in accordance to the control signals 311, 312. The time interval during which the inductor current 310 is directed to the first output port 131 is referred to as a first time interval 321, and a time interval during which the inductor current 310 is directed to the second output port 132 is referred to as a second time interval 322.

It can be seen that there are non-overlapping time intervals 320 between the pulses of the first and second control signals 311, 312 (i.e. between a first time interval 321 and a second time interval 322), during which neither the first output port 131 nor the second output port 132 is coupled to the main inductor 105. As a result of this, the inductor current 310 might be lost, leading to power losses within the power converter 100.

The power converter 100 of FIG. 1 comprises a bypass switch 106 (notably a bypass diode) for the inductor current 310 within the non-overlapping time intervals 320, which is referred to herein as the bypass current 313 (see FIG. 3). The bypass switch 106 may be a switch or a bi-directional switch. In the example of FIG. 1, the bypass current 313 is used for charging a boost capacitor 110 which is coupled to ground via a charging switch 111. The charging switch 111 (and/or one of the switches 113, 115) may be turned on during the non-overlapping time intervals 320, thereby allowing the boost capacitor 313 to be charged. On the other hand, the charging switch 111 may be turned off for the rest of the time 301. FIG. 3 shows example control signals 314 for the charging switch 111. Hence, the bypass current 313 may be stored at least partially within the boost capacitor 110 and may be used for various different purposes within the power converter 100. As a result of this, a power efficient power converter 100 having multiple outputs 131, 132 is provided.

By way of example, the charge from the boost capacitor 313 may be used for charging the gates 121, 122 of the high side switch 101 and/or the low side switch 122 and/or the gates of the output switches 103, 104 via the control switches 112, 113, 114, 115. It should be noted that the number of control switches or control switch pairs may be varying. In an example there may be just one switch connecting the boost capacitor 110 to one power switch gate. In a further example, the negative capacitance plate may be grounded.

In the example of FIG. 1, the power converter 100 further comprises an auxiliary switch (also referred to as an auxiliary power switch) 109 which is configured to couple the main inductor 105 to ground. The auxiliary switch 109 may be used to provide an inductor current 310 for charging the boost capacitor 110 in cases, where no or too little energy transfer occurs to the output ports 131, 132 of the power converter 100. In other words, the auxiliary switch 109 may be used to provide an inductor current 310, which may be used for charging the boost capacitor 110. In view of the fact that the current for charging the boost capacitor 110 is typically small in this case, the auxiliary switch 109 may be relatively small.

Hence, a single boost capacitor 110 may be used to store the energy for the gates of the (e.g. all) power switches of the power converter 100. By using a boost capacitor 110, some or all gates in the power converter 100 may be connected to an optimum gate voltage for MOS switches, wherein the gate voltage may be set using a target voltage at the boost capacitor 110. The energy during the non-overlapping time intervals 320 (which would otherwise be lost) may be used for charging the boost capacitor 110.

FIG. 1 shows a SIDO buck power converter 100. It should be noted, however, that the concept is applicable to generic SIMO buck and/or boost architectures. It may also be used for conventional power converters with only a single output.

In the example power converter 100 of FIG. 1, the energy of the main inductor 105 during the non-overlapping time intervals 320 of the first and second output switches 104, 103 is used to charge the boost capacitor 110. The amount of energy which is stored in the boost capacitor 110 can be controlled by variation of the duration of the non-overlapping time intervals 320. By way of example, the duration of the non-overlapping time interval 320 may be adjusted as a function of the level of the inductor current 313 during the non-overlapping time intervals 320. In particular, the duration of the non-overlapping time interval 320 may be increased if the level of the inductor current 313 during the non-overlapping time interval 320 decreases (and vice versa). The charge from the boost capacitor 110 may be used for charging the gate of the individual power switches 101, 102, 103, 104, 109 of the power converter 100. For this purpose, the gate of a power switch 101, 102, 103, 104, 109 may be coupled to the boost capacitor 110 for a charging time interval, wherein the charging time interval has a duration which is sufficiently long to charge the gate capacitor of the power switch 101, 102, 103, 104, 109. Otherwise the gate of a power switch 101, 102, 103, 104, 109 may be decoupled from the boost capacitor 110. As such, the boost capacitor 110 may be used to provide charge pulses for charging the gate capacitor of a power switch 101, 102, 103, 104, 109 of the power converter.

Subsequent to the transition of a respective power switch 101, 102, 103, 104, 109 to a particular state (e.g. the on-state), the gate capacitor of the power switch maintains the charge at the gate, thereby maintaining the power switch within the particular state. By discharging the gate capacitor, the state of the respective power switch may be changed.

The boost capacitor 110 may be used to charge only the gates of some of the power switches 101, 102, 103, 104, 109 of the power converter 100. By way of example, in FIG. 1 the source of the low side switch 102 is grounded, such that the gate of the low side switch 102 may also be charged from the input voltage 120 (without the need of providing a floating voltage using the boost capacitor 110). In FIG. 1 all of the power switches 101, 102, 103, 104, 109 are n-type MOS transistors. It should be noted that one or more of the power switches 101, 102, 103, 104, 109 may be implemented as p-type MOS transistors or as other types of transistors.

The power converter 100 comprises a control unit 150 which is configured to control the different control switches 111, 112, 113, 114, 115 of the power converter 100. By doing this, the control unit 150 may control the charging and discharging of the gate capacitors of the different power switches 101, 102, 103, 104, 109 of the power converter 100. In particular, the control unit 150 may be configured to control the control switches such that the boost capacitor 110 is charged to a particular target voltage (e.g. 5V). For this, purpose, the control unit 150 may vary the duration of the non-overlapping time interval 320, such that the voltage at the boost capacitor 110 is set to the target voltage. Typically the duration of the non-overlapping time interval 320 decreases with increasing inductor current 310. The electrical charge of the boost capacitor 110 may then be used for charging the gates of the different power switches 101, 102, 103, 104, 109 of the power converter 100.

Figure 2:
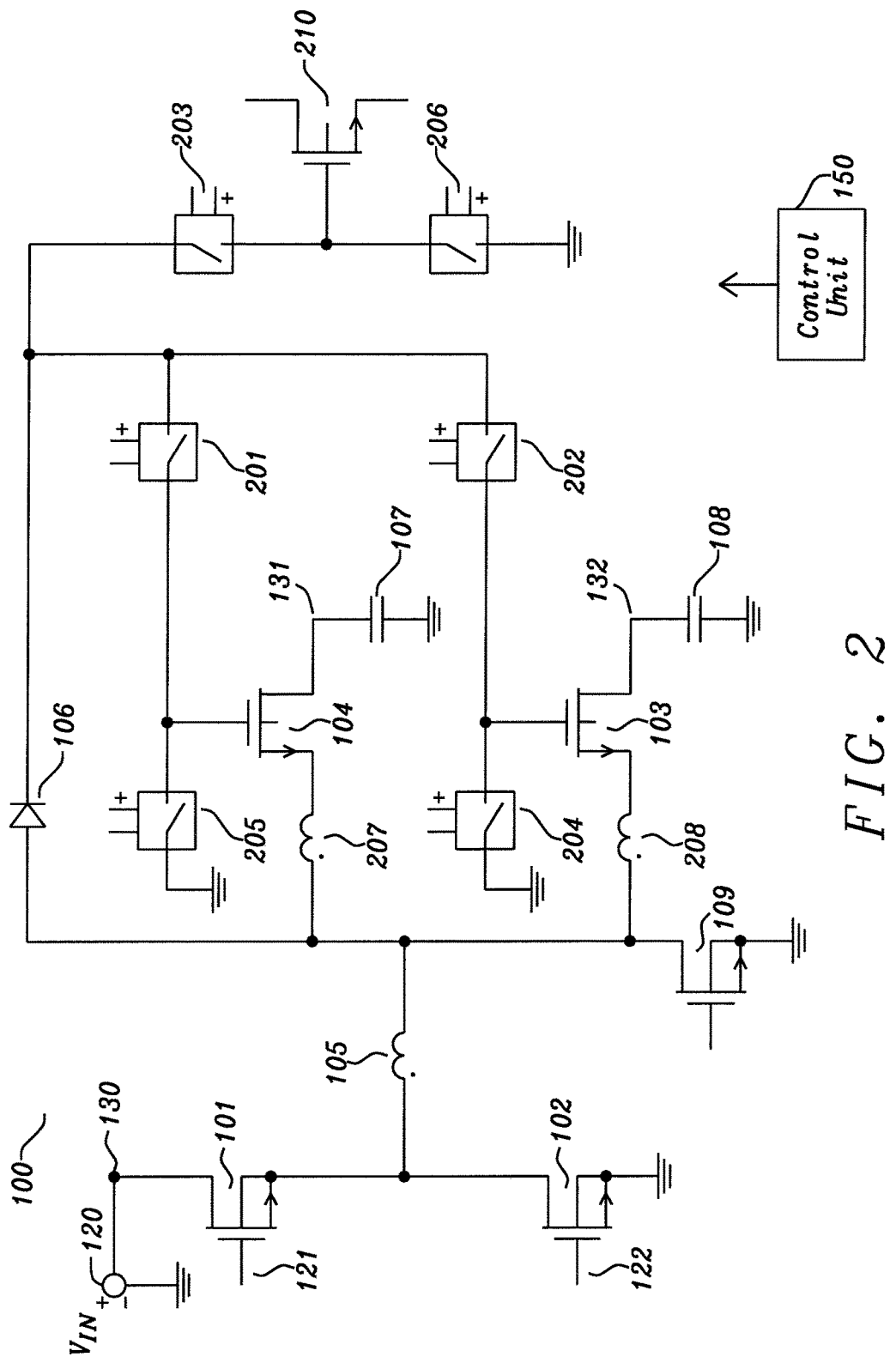

FIG. 2 shows an example power converter 100 which is configured to use the bypass current 313 for charging the gates of different power switches 103, 104 of the power converter 100 without using a boost capacitor 110. In the illustrated example, the bypass current 313 may be directed to the gate of the first output switch 104 or to the gate of the second output switch 103 using the control switches 201, 205 or 202, 204, respectively. As a result of this, the gate capacitors of the respective power switches 104, 103 may be charged. Furthermore, the power converter 100 comprises a first output inductor 207 which is coupled in series between the main inductor 105 and the first output switch 104, as well as a second output inductor 208 which is coupled in series between the main inductor 105 and the second output switch 103.

Subsequent to turning off the first output switch 104 (by discharging the gate capacitor of the first output switch 104 using the control switch 205) and in preparation to turning on the second output switch 103, the gate capacitor of the second output switch 103 may be charged using the bypass current 313. For this purpose, the control switch 202 may be closed (while maintaining the control switch 204 open). The second output inductor 208 behaves as a delay element that ensures that the potential at the source of the second output switch 103 is lower than the potential at the gate of the second output switch 103 (while the control switch 202 is closed). As a result of this, there is a voltage drop across the gate-source capacitor (or gate capacitor) which leads to a charging of the gate-source capacitor (i.e. the gate capacitor) of the second output switch 103. Once the gate-source capacitor is charged, the second output switch 103 is turned on and the control switch 202 may be opened (while maintaining the control switch 204 open). Subsequently (in preparation to turning of the second output switch 103), the control switch 204 may be used to discharge the gate capacitor and to turn off the second output switch 103. In an analogous manner, the first output switch 104 may be turned on using the control switches 201, 205.

FIG. 2 shows a further power switch 210 and further control switches 203, 206, in order to illustrate that the bypass current 313 may be used for controlling various other power switches 210 of other electronic devices.

Figure 4:
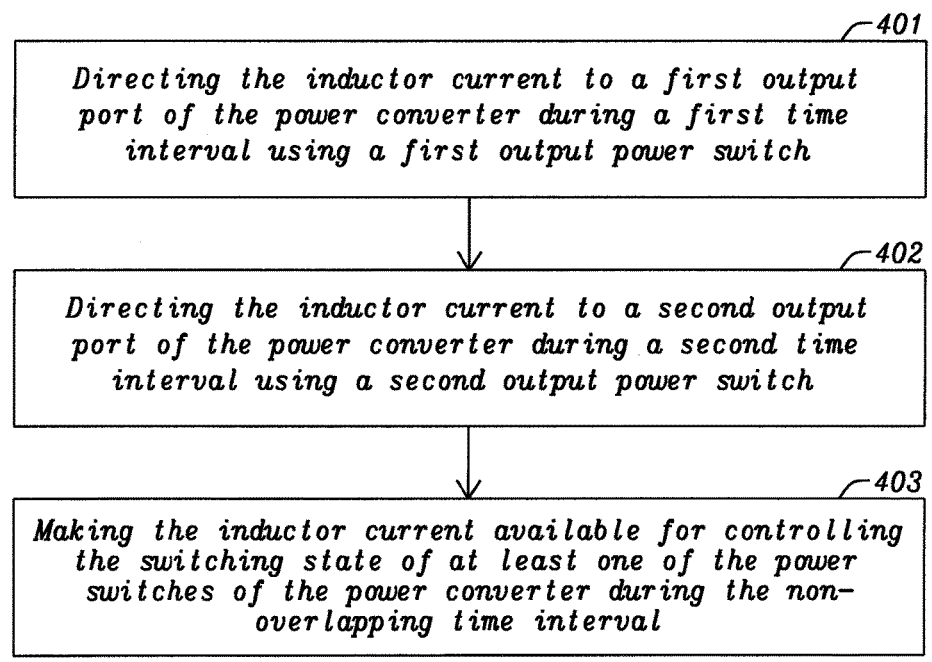
FIG. 4 shows a flow chart of an example method for operating a power converter having multiple outputs.

FIG. 4 shows a flow chart of an example method 400 for controlling a power converter 100. In particular, the method 400 is directed at distributing the inductor current 310 of a switched mode power converter 100, wherein the power converter 100 comprises a main inductor 105 and a half bridge with a high side power switch 101 and a low side power switch 102 for generating the inductor current 310. The method 400 may be executed by a control unit 150 of the power converter 100.

The method 400 comprises directing 401 the inductor current 310 to a first output port 131 of the power converter 100 during a first time interval 321 using a first output power switch 104. Furthermore, the method 400 comprises directing 402 the inductor current 310 to a second output port 132 of the power converter 100 during a second time interval 322 using a second output power switch 103. The first and second time intervals 321, 322 are mutually exclusive and separated by a non-overlapping time interval 320. The method 400 further comprises making 403 the inductor current 310 available for controlling the switching state of at least one of the power switches 101, 102, 103, 104 of the power converter 100 during the non-overlapping time interval 320.

Voltage clamping of the boost capacitor 110 may be used to limit the charge that is provided to the boost capacitor 110. By way of example, a Zener diode may be used to limit the voltage drop across the boost capacitor 110. As outlined above, the duration of the non-overlapping time interval may be varied in dependence of the charge that is to be provided to the boost capacitor 110. However, there may be a lower limit regarding the duration of the non-overlapping time interval, and the cumulated inductor current 313 during the non-overlapping time interval may be too high for charging the boost capacitor 110. The voltage clamping may therefore protect the boost capacitor 110.

In the present document, a power efficient power converter 100 with multiple output ports 131, 132 is described. The power converter 100 makes use of a bypass switch 106 for making the inductor current 310 available for the supply of electronic components during the non-overlapping time intervals 320 of the power converter 100. By doing this, the power consumption of the power converter 100 may be reduced, notably because no additional charge pump or bootstrap circuits are required for charging the gates of the power switches 101, 102, 103, 104, 109 of the power converter 100. Furthermore, the bypass current 313 may be used for charging a boost capacitor 110 configured to provide an optimum gate voltage for the control of different power switches 101, 102, 103, 104, 109 of the power converter 100.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A switched mode power converter comprising
a main inductor and a half bridge, which are configured to generate an inductor current;
a first output power switch configured to direct the inductor current to a first output port of the power converter;
bypass circuitry configured to make the inductor current available for controlling the switching state of at least one of the power switches of the power converter; and
a control unit configured to
control the first output power switch such that the inductor current is directed to the first output port within first time intervals; wherein a time interval between successive first time intervals comprises a non-overlapping time interval; and
control the bypass circuitry to make the inductor current available for controlling the switching state of the at least one power switch during the non-overlapping time interval;
wherein
the bypass circuitry comprises a first control switch configured to direct the inductor current to a control port of the at least one power switch;
the control unit is configured to control the first control switch to direct the inductor current to the control port of the at least one power switch during the non-overlapping time interval, in order to turn on the at least one power switch;
the at least one power switch comprises the first output power switch;
the first output power switch comprises an input port and the control port; and the bypass circuitry comprises a first output inductor which is arranged such that the inductor current flows through the first output inductor during the first time intervals and such that the inductor current does not flow through the first output inductor within the non-overlapping time interval.

2. The power converter of claim 1, wherein
the power converter comprises a second output power switch configured to direct the inductor current to a second output port of the power converter; and
the control unit is configured to control the first output power switch and the second output power switch such that the inductor current is directed to the first output port and to the second output port within different, mutually exclusive, first and second time intervals; wherein the first time interval and the second time interval are separated by the non-overlapping time interval.

3. The power converter of claim 1, wherein
the at least one power switch comprises a metal oxide semiconductor transistor which exhibits a gate capacitor; and
the bypass circuitry is configured to make the inductor current available for charging the gate capacitor.

4. The power converter of claim 1, wherein the bypass circuitry comprises a bypass switch, notably a diode, configured to direct the inductor current to a control port of the at least one power switch.

5. The power converter of claim 1, wherein the bypass circuitry comprises a boost capacitor which is arranged to be charged by the inductor current during the non-overlapping time interval.

6. The power converter of claim 5, wherein the control unit is configured to vary a duration of the non-overlapping time interval in dependence of a target charging level of the boost capacitor.

7. The power converter of claim 5, wherein
the boost capacitor is coupled at a first end via a bypass switch to an input port of the first output power switch;
the bypass circuitry comprises a charging switch which is configured to couple a second end of the boost capacitor to or to decouple the second end of the boost capacitor from ground;
the control unit is configured to
control the charging switch such that the second end of the boost capacitor is coupled to ground during at least part of the non-overlapping time interval; and
control the charging switch such that the second end of the boost capacitor is decoupled from ground during the first and second time intervals.

8. The power converter of claim 5, wherein
the bypass circuitry comprises one or more control switches which are configured to couple the boost capacitor with a control port of the at least one power switch; and
the control unit is configured to control the one or more control switches to couple the boost capacitor with the control port of the at least one power switch, in order to turn on the at least one power switch.

9. The power converter of claim 1, wherein
the bypass circuitry comprises a second control switch configured to couple the control port of the at least one power switch to ground; and
the control unit is configured to control the second control switch to couple the control port of the at least one power switch to ground, in order to turn off the at least one power switch.

10. The power converter of claim 1, wherein
the half bridge comprises a high side power switch and a low side power switch;
the power converter comprises a buck converter; and
the main inductor is coupled with an input port of the first output power switch; or
the power converter comprises a boost converter; and
the high side power switch is coupled with input port of the first output power switch.

11. The power converter of claim 1, wherein the half bridge comprises a high side power switch and a low side power switch; and wherein the control unit is configured to
turn on the high side power switch and the low side power switch in a mutually exclusive manner at a commutation cycle rate to generate the inductor current; and/or
turn on the first output power switch and a second output power switch in a mutually exclusive manner, in dependence of load current requirements of loads at the first and at a second output port.

12. The power converter of claim 1, wherein
the power converter comprises an auxiliary power switch which is configured to direct the inductor current to ground; and
the control unit is configured to control the auxiliary power switch in dependence of load current requirements of loads at the first and at a second output port.

13. A method for distributing an inductor current of a switched mode power converter which comprises a main inductor and a half bridge, which are configured to generate the inductor current; the method comprising
directing the inductor current to a first output port of the power converter during a first time interval using a first output power switch;
directing the inductor current to a second output port of the power converter during a second time interval using a second output power switch; wherein the first and second time intervals are mutually exclusive and separated by a non-overlapping time interval; and
making the inductor current available for controlling the switching state of at least one of the power switches of the power converter during the non-overlapping time interval;
wherein
the bypass circuitry comprises a first control switch configured to direct the inductor current to a control port of the at least one power switch;
the control unit is configured to control the first control switch to direct the inductor current to the control port of the at least one power switch during the non-overlapping time interval, in order to turn on the at least one power switch;
the at least one power switch comprises the first output power switch;
the first output power switch comprises an input port and the control port; and the bypass circuitry comprises a first output inductor which is arranged such that the inductor current flows through the first output inductor during the first time intervals and such that the inductor current does not flow through the first output inductor within the non-overlapping time interval.

14. A method of providing a switched mode power converter comprising the steps of:
generating an inductor current with a main inductor and a half bridge;
directing the inductor current to a first output port of the power converter with a first output power switch;
making the inductor current available for controlling the switching state of at least one of the power switches of the power converter, using the bypass circuitry; and
providing a control unit to
control the first output power switch such that the inductor current is directed to the first output port within first time intervals; wherein a time interval between successive first time intervals comprises a non-overlapping time interval; and
control the bypass circuitry to make the inductor current available for controlling the switching state of the at least one power switch during the non-overlapping time interval;
wherein
the bypass circuitry comprises a first control switch configured to direct the inductor current to a control port of the at least one power switch;
the control unit is configured to control the first control switch to direct the inductor current to the control port of the at least one power switch during the non-overlapping time interval, in order to turn on the at least one power switch;
the at least one power switch comprises the first output power switch;
the first output power switch comprises an input port and the control port; and the bypass circuitry comprises a first output inductor which is arranged such that the inductor current flows through the first output inductor during the first time intervals and such that the inductor current does not flow through the first output inductor within the non-overlapping time interval.

15. The method of claim 14, wherein
the power converter comprises a second output power switch to direct the inductor current to a second output port of the power converter; and
the control unit controls the first output power switch and the second output power switch such that the inductor current is directed to the first output port and to the second output port within different, mutually exclusive, first and second time intervals; wherein the first time interval and the second time interval are separated by the non-overlapping time interval.

16. The method of claim 14, wherein
the at least one power switch comprises a metal oxide semiconductor transistor which exhibits a gate capacitor; and
the bypass circuitry makes the inductor current available for charging the gate capacitor.

17. The method of claim 14, wherein the bypass circuitry comprises a bypass switch, notably a diode, to direct the inductor current to a control port of the at least one power switch.

18. The method of claim 14, wherein the bypass circuitry comprises a boost capacitor which is arranged to be charged by the inductor current during the non-overlapping time interval.

19. The method of claim 18, wherein the control unit varies a duration of the non-overlapping time interval in dependence of a target charging level of the boost capacitor.

\* \* \* \* \*